(12) United States Patent
Nguyen

(10) Patent No.: US 6,429,629 B1
(45) Date of Patent: Aug. 6, 2002

(54) SWITCH-MODE POWER SUPPLIES

(76) Inventor: Tranh To Nguyen, 1552 Magnolia Ave., Rohnert Park, CA (US) 94928

( * ) Notice: Subject to any disclaimer, the term of this patent is extended or adjusted under 35 U.S.C. 154(b) by 0 days.

(21) Appl. No.: 09/802,655

(22) Filed: Mar. 8, 2001

(51) Int. Cl.[7] .................................................. G05F 1/14
(52) U.S. Cl. ........................................................ 323/255
(58) Field of Search ............................. 363/16, 24, 25, 363/131, 133, 59; 323/255, 259, 362, 340, 344, 345

(56) References Cited

U.S. PATENT DOCUMENTS

| | | | | |
|---|---|---|---|---|
| 5,162,981 A | * | 11/1992 | Lazar et al. ................... 363/22 |
| 5,459,650 A | * | 10/1995 | Noro ............................ 363/24 |
| 5,488,554 A | * | 1/1996 | Green .......................... 363/25 |
| 5,654,881 A | * | 8/1997 | Albrecht et al. ............... 363/25 |
| 6,288,913 B1 | * | 9/2001 | White .......................... 363/16 |

* cited by examiner

*Primary Examiner*—Matthew Nguyen

(57) ABSTRACT

A family of switch-mode power supplies with low current stresses on switches and capable of producing an output voltage higher than the input voltage, incorporating a multiple-tap transformer driven by at least one ground-referenced switch. When the transformer is center-tapped, it is driven by two ground-referenced switches. The current stress in each switch is equal to the difference between the source current and the load current. The converters can operate in zero current switching and zero voltage switching. Integrated magnetics can be used to reduce further component count.

21 Claims, 9 Drawing Sheets

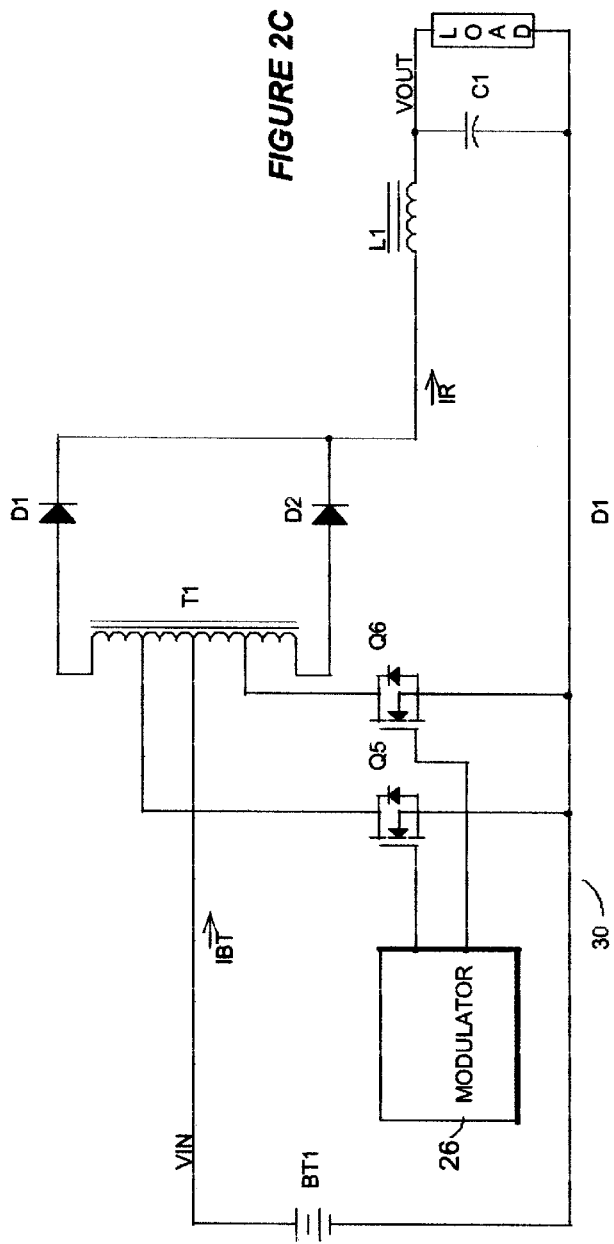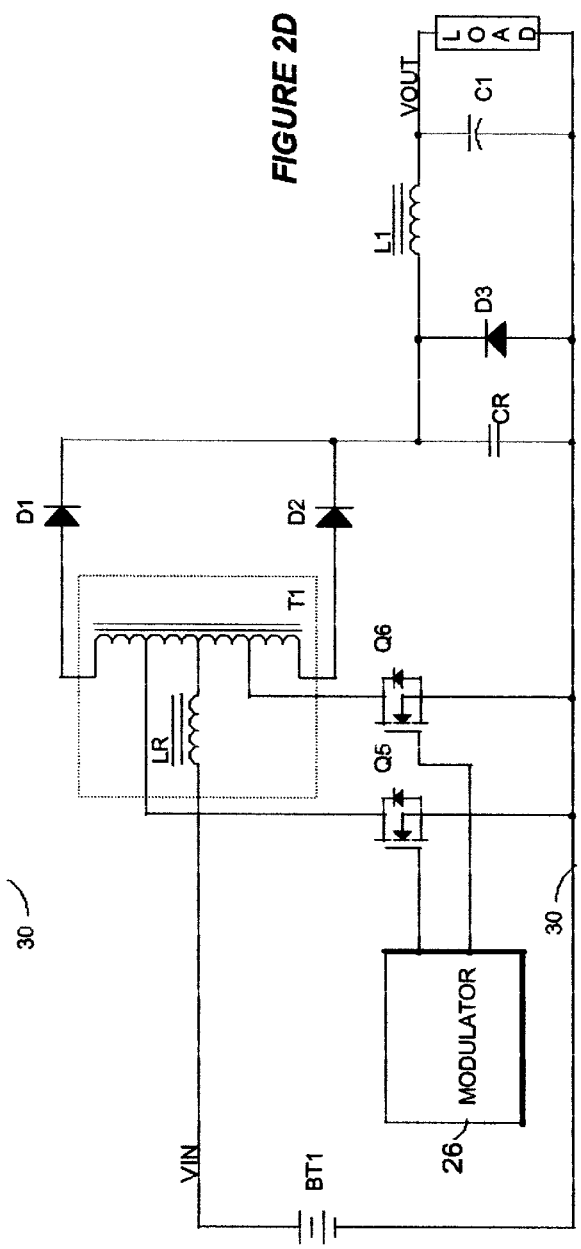

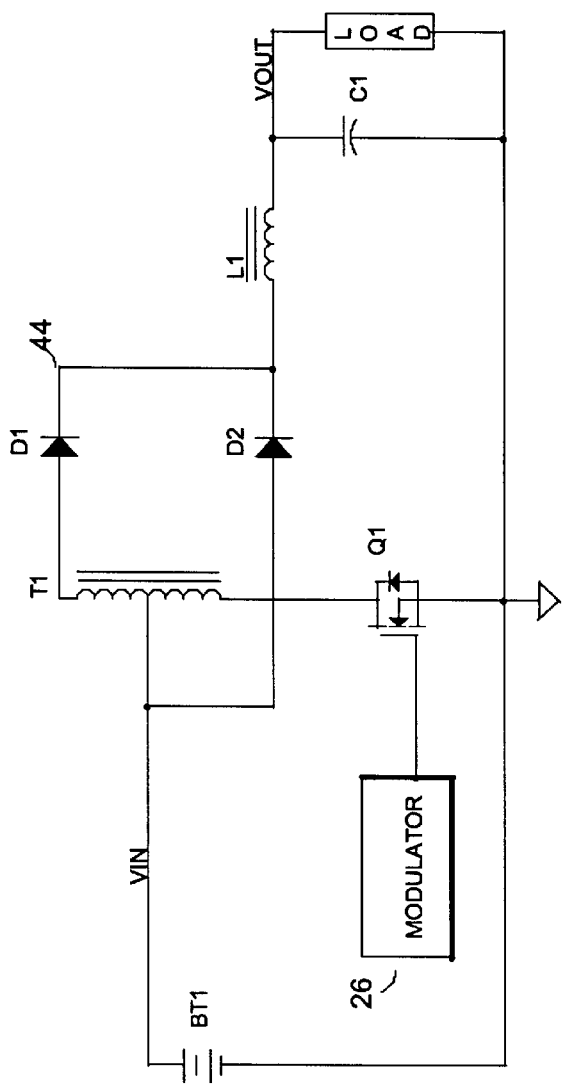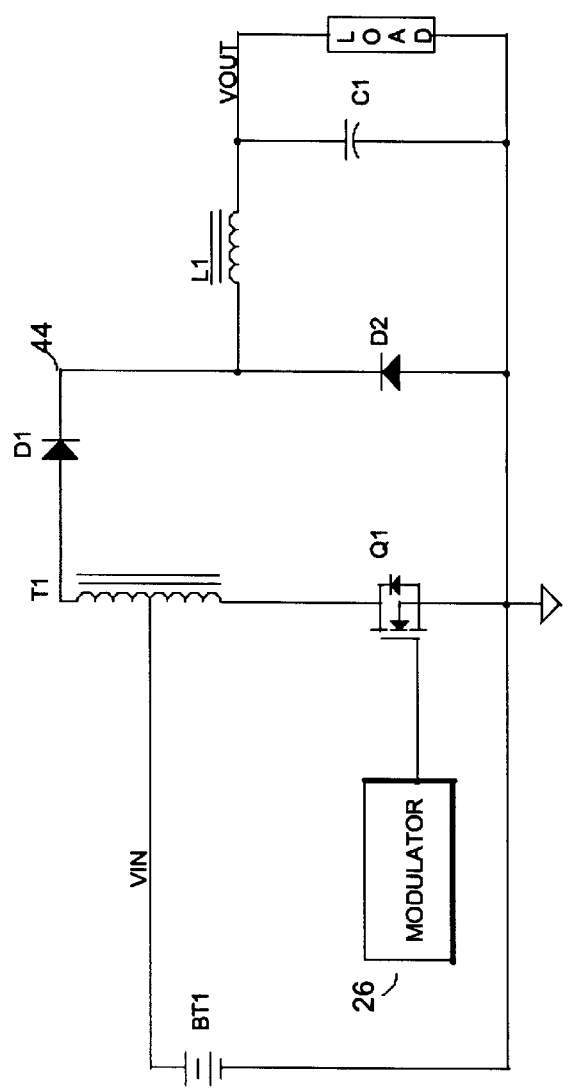

SWITCH-MODE POWER SUPPLIES

FIELD OF INVENTION

The present invention relates generally to switch-mode power supplies, and specifically to switch-mode power supplies operating from low voltages.

BACKGROUND OF INVENTION

Power converters or power supplies are well known subjects to electronics engineers. In automotive applications where the vehicle chassis forms a ground reference, power supplies for electronics must operate from battery voltage which can get as low as 7 volts when the ambient air temperature is below freezing, even down to 3.5V when a starter is activated. Most modern electronic circuits operate on standard voltages such as +12V, +5V, and −12V. Therefore a buck-type, as depicted in FIG. 1A, or boost-type, as depicted in FIG. 1B, switch-mode power supply (SMPS) cannot be used alone in automotive applications. A flyback SMPS, as depicted in FIG. 1C, can be used, only to supply relative low power levels. As a result of low minimum battery voltages, the current level that a SMPS has to deal with can be very high, in the tens of amperes for an output power of just about 50–100 watts. Conventional approaches to SMPS, such as the forward converter taught in U.S. Pat. No. 4,870,555, or the push-pull converter taught in U.S. Pat. No. 5,140,509, or a flyback SMPS result in high losses in the MOSFET switches, and in the snubber networks, even in the so-called "lossless" snubbers or active core reset circuits. In such a lossless snubber, a current of 20 amperes through a Schottky rectifier would result in over 5 watts of heat dissipation in that rectifier. MOSFETs switching such a high current will dissipate similar heat quantities. Therefore the requirements of high efficiency, small size and low cost may not be easily met. These requirements apply even more relevantly to portable equipment operating from lower voltage battery such as portable camera and boom boxes, and home/office equipment such uninterruptable power supplies (UPS) and battery-operated appliances.

Thus there is a need for a better approach to power supplies for automotive, portable and mobile applications, or in general for battery-operated electronics, especially when the power demand is over 50 watts. Such power demand is common for some high power audio amplifiers, inverters, and computer-controlled systems.

SUMMARY OF THE INVENTION

The invention provides a family of high power converters operating from low voltages. This family of converters essentially replaces switches and transformer windings carrying high currents in opposing directions with switches and windings processing the difference of those high currents, an approach that results in very substantial reductions in conduction and switching losses, as well as reduced losses in auxiliary circuits such as snubber networks and core reset circuits. Some of the transformers used in the various embodiments only have a tapped winding conducting only the difference of currents, therefore they are very small compared to a conventional multiple-winding transformer processing the same power, each winding conducting much higher current. In some of the embodiments, the modulator sequences the drive signals to the switches in such a way that switches carrying heaviest currents switch in zero current switching.

OBJECTS AND ADVANTAGES

Accordingly, several objects and advantages of this invention are:

(a) to provide a method and apparatus to supply regulated power to battery-operated electronics (b) to provide a method to minimize the size of high power SMPS operating from low voltage (c) to provide a method for minimizing component count in SMPS (d) to provide a method and apparatus for reducing switching losses by zero current switching.

Further objects and advantages of this invention will become apparent from a consideration of the drawings and ensuing description.

BRIEF DESCRIPTION OF THE DRAWINGS

FIGS. 2A to 2E show schematics of the first embodiments of a SMPS of the present invention, where a pair of ground-referenced push-pull switches drive a center-tapped transformer to provide a wide range of output voltages lower or higher than the input voltage, in configurations ranging from hard switching, FIG. s 2A–2C, to zero current switching, FIG. 2D, and zero voltage switching, FIG. 2E.

FIGS. 3A to 3F show schematics of the second embodiments of single-switch SMPS of the present invention, in configurations ranging from hard switching, FIGS. 3A–3B, to zero current switching, FIG. 3C–2D, zero voltage switching, FIG. 2E, and with integrated magnetics, FIG. 3F. FIG. 3H shows its ZCS derivation, while

DESCRIPTION OF THE INVENTION

Figure 1A:
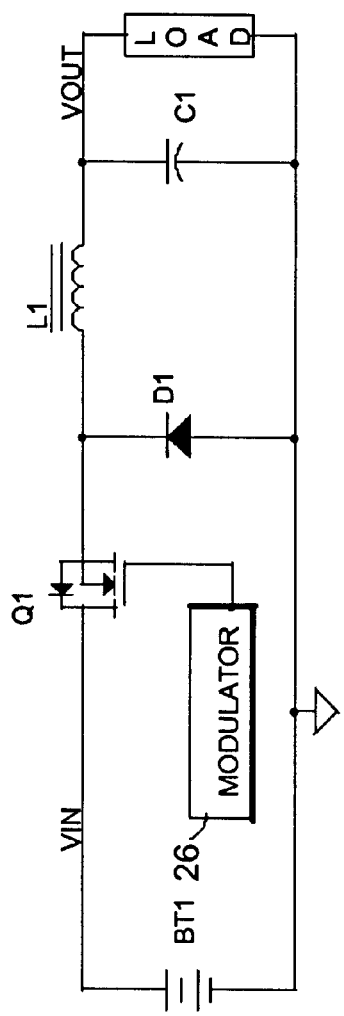
FIGS. 1A to 1C show schematics of prior art SMPSs, namely a buck converter, FIG. 1A, a boost converter, FIG. 1B, and a flyback converter, FIG. 1C.
Figure 1B:
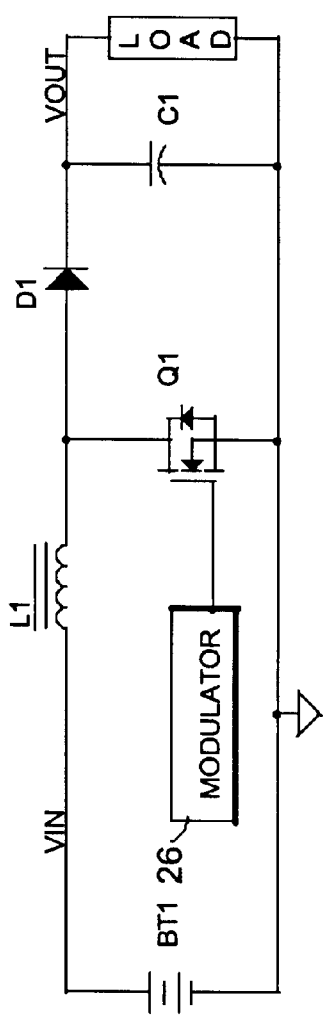
Figure 1C:
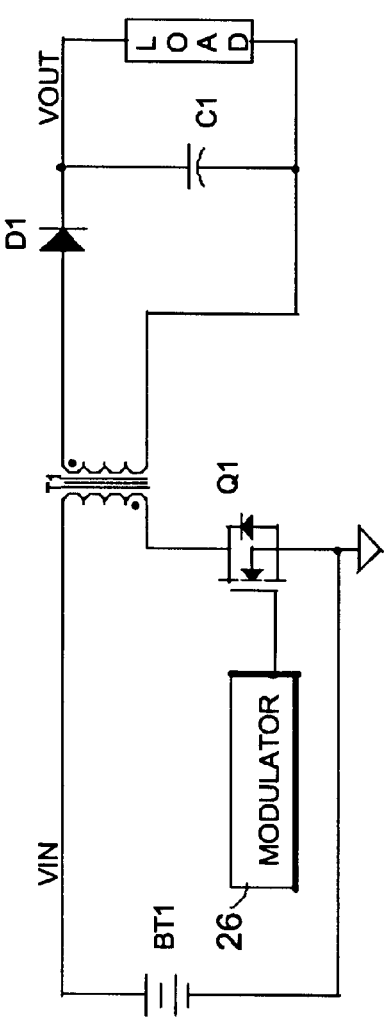
Figure 2A:
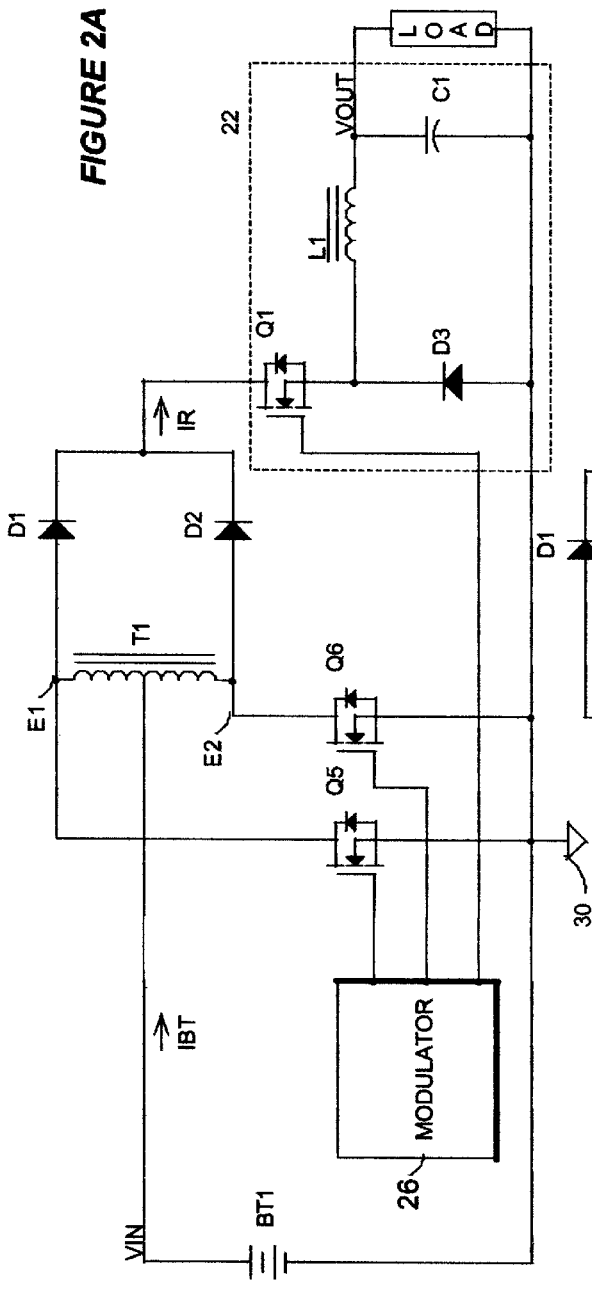

The invented arrangement in a first embodiment, FIG. 2A, comprises a center-tapped transformer T1 operated in push-pull mode. The transformer T1 is driven by a pair of push-pull switches Q5 and Q6, which are preferably MOSFETs, but which can be any other sort of electronic switch known to those skilled in the art, such as a bipolar transistor, an IGBT. However its similarity to a push-pull SMPS stops there. The two end taps E1 and E2 of the center-tapped transformer T1 now are connected to rectifiers D1 and D2 driving a buck converter 22, which is driven synchronously by the same modulator 26 which drives the push-pull switches Q5–Q6. The conventional buck converter 22 comprises a switch Q1, a rectifier D3, and a current smoothing L1, and optionally a capacitor C1. The modulator 26 can be a pulse-width modulator (PWM), a pulse-frequency modulator (PFM), a hysteretic modulator etc . . . . This invented circuit arrangement has a voltage gain of 2 times the duty ratio D of the push-pull stage, which can be varied from 0 to about 98%. Thus, this converter 20 can supply any output voltage VOUT from zero to almost twice its input voltage VIN, including the very popular 12-volt if the battery voltage varies between 7 and 15 volts. Additionally, a cursory analysis of the circuit arrangement shows that the currents switched by the push-pull switches Q5–Q6 are substantially the same as the output current IR, and are approximately half of the input current IBT. Thus the conduction losses in the switches are only one-fourth of the conduction losses of a conventional push-pull SMPS, being proportional to the square of the switch current ($P=RI^2$). Similarly, losses in auxilliary circuits such as snubbers, if used, which are also proportional to the square of the current, would be only one-fourth compared to a conventional push-pull converter.

Figure 2B:
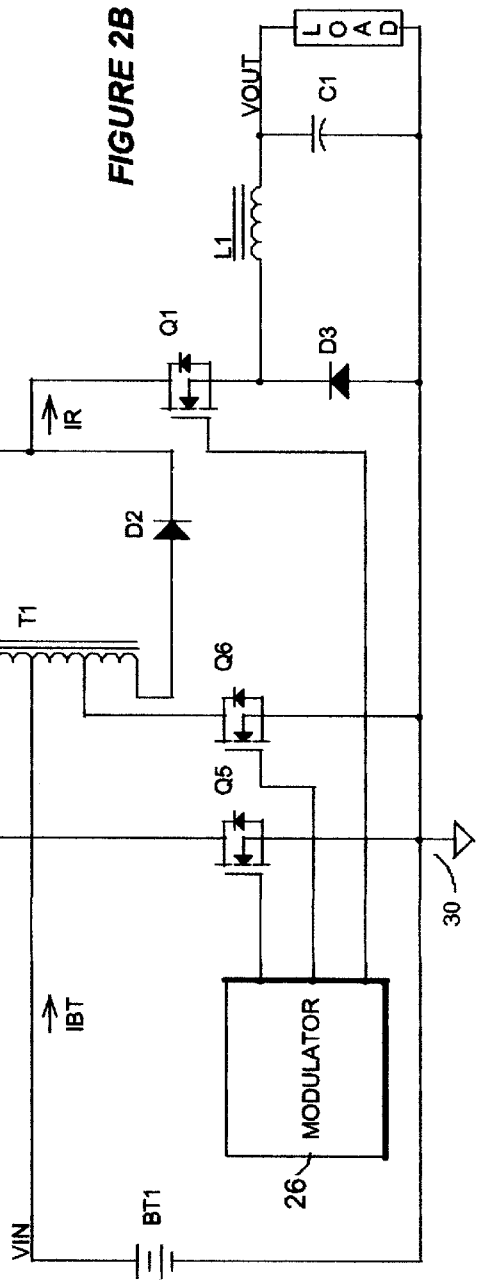
Figure 2E:
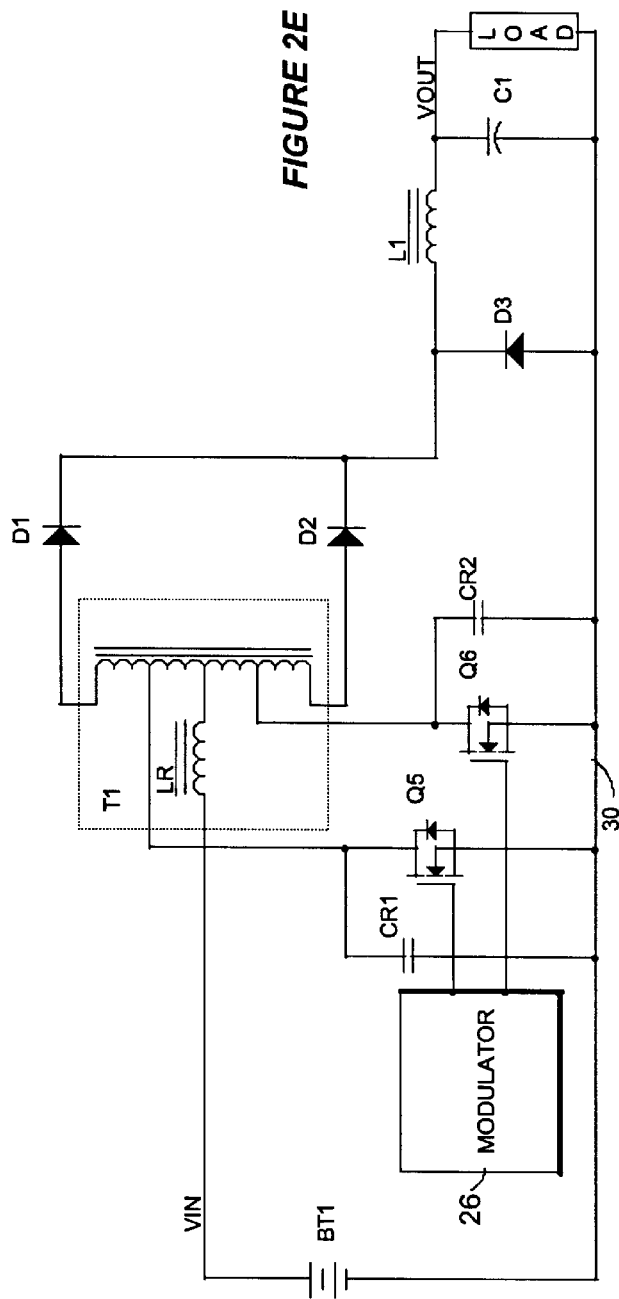
Figure 2F:
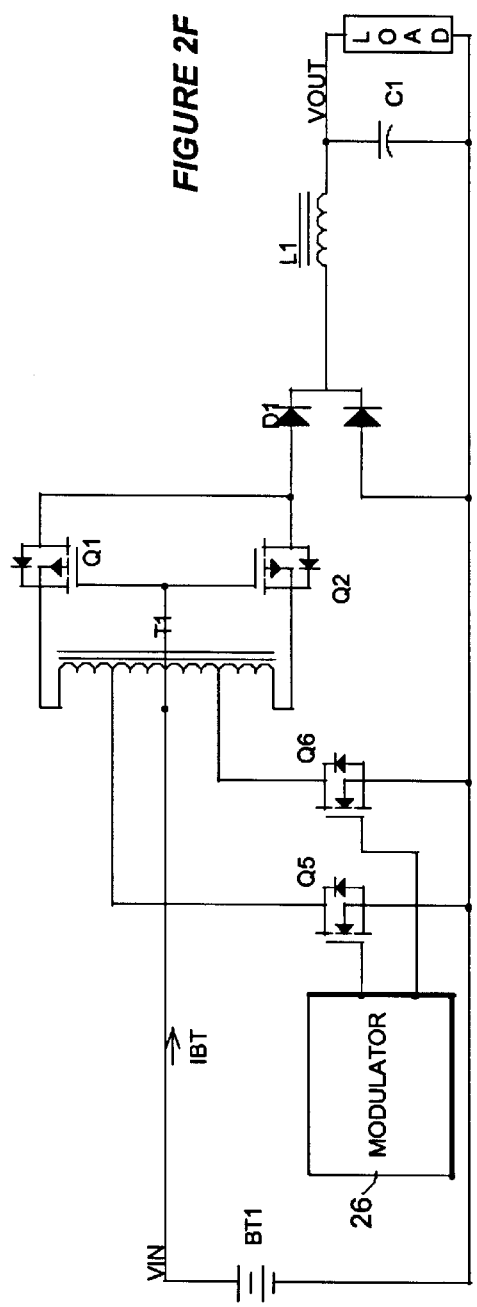
FIG. 2F illustrates the use of MOSFETs as unidirectional devices in these first embodiments.

In a more general embodiment, the center-tapped transformer T1 is tapped for a 1:n turn ratio between input turns and output turns, FIG. 2B. The gain of this circuit arrangement now is (n+1) * D. This is different from a gain of n * D of a conventional push-pull SMPS. The current processed by the switches Q5–Q6 is the difference between the battery current IBT and the rectifier current IR. Additionally, the demands on snubbers, if they are used, are much lower. When the output voltage VOUT is to be higher than the input voltage VIN, the MOSFET Q1 and rectifier D3 are not needed, as shown in the embodiment of FIG. 2C. On the other hand, by adding a resonant capacitor CR across the rectifier D3 and constructing the transformer T1 with a controlled leakage inductance LR, FIG. 2D, the resulting circuit arrangement can operate in zero current switching (ZCS). When resonant capacitors CR1–CR2 are added across the switches Q5–Q6, FIG. 2E, the circuit arrangement can operate in zero voltage switching (ZVS). In addition to smaller size of components due to lower current stresses, one major advantage of these embodiments of FIGS. 2A–2E is the inherent transformer core reset due to the symmetry of the transformer T1. Resetting the transformer core has been a major issue and ensuing litigation for high efficiency power converters, as discussed in U.S. Pat. Nos. and 6,141,224 and other related patents. It is interesting to note that the "optimum" transformer reset scheme of U.S. Pat. Nos. 4,441,146 or 6,141,224 requires an additional switch, for a total of two active switches, the same number of switches as in the embodiments of FIG. 2C–2E of the present invention. FIG. 2F shows another variation of the embodiment of FIG. 2A where two P-channel MOSFET Q1–Q2 take the position of the rectifiers D1–D2 but act as part of the buck converter 22, while a center-tapped rectifier D1 takes the place of the free-wheeling rectifier D3 of FIG. 2A. This embodiment is shown for completeness, because it may not be cost-effective in some cases.

An extension of this topology is a non-isolated SMPS with transformer T1 and a ground-referenced switch Q1, as shown in FIG. 3A. This topology is new in many aspects. The first novelty is that the switch Q1 is ground-referenced, which makes it very easy and economical to drive. The second novelty is the voltage at the common node 44 of the two rectifiers D1–D2 swing between VIN * n and VIN. The third novelty is the fact the output voltage VOUT can be of any magnitude and polarity, positive or negative, depending on the transformer turn ratio and the direction of the rectifiers. Yet another variation of this topology is the converter of FIG. 3B, where now one end of the rectifier D3 is grounded. These two similar topologies enjoy a further improvement, FIG. 3F, when the transformer T1 is combined with the inductor L1 into a single piece of magnetics IM1 with three windings, two of which are in series. It can be demonstrated by the skilled-in-the-art that with a proper turn ratio between the L1 inductance winding and the transformer T1 windings, namely a turn ratio proportional to the ratio of their respective voltages, the ripple current in the inductance winding can be made very small, due to the ripple steering effect of integrated magnetics IM1, FIG. 3F, when the integrated magnetics IM1 is properly designed. It is essential to emphasize that these topologies represent unequaled improvements over the well-known buck converter in many areas, the first being the ground-reference switch Q1 which is simple and economical to drive, the second being its capability of providing an output voltage VOUT of any magnitude and polarity. The third improvement is the lower current stress on the switch 1 in case of positive output voltage VOUT. The fourth improvement is the possible use of integrated magnetics IM1, not only to reduce size and cost but also to reduce the ripple current in the output capacitor C1. Of course synchronous rectifiers can be used in lieu of regular rectifiers D1–D2 to further improve the efficiency of this family of converters.

Figure 3C:
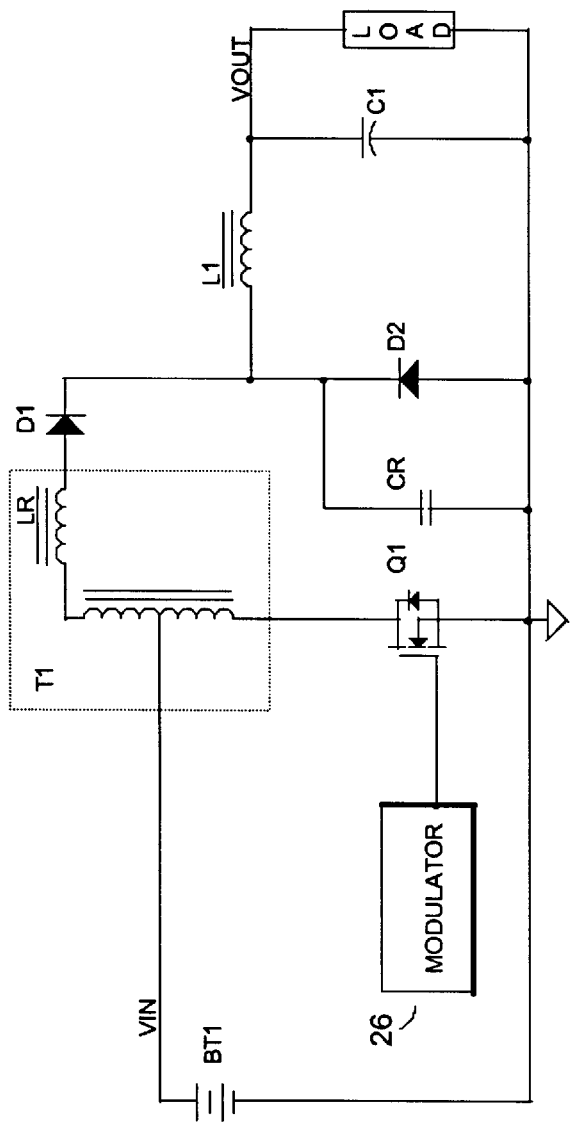
Figure 3D:
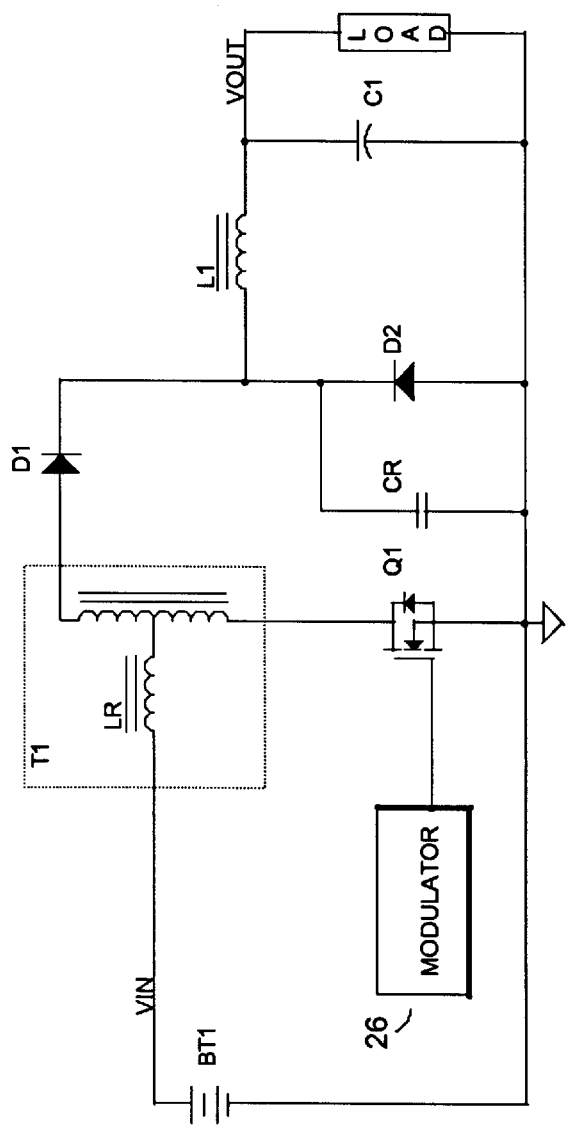
Figure 3E:
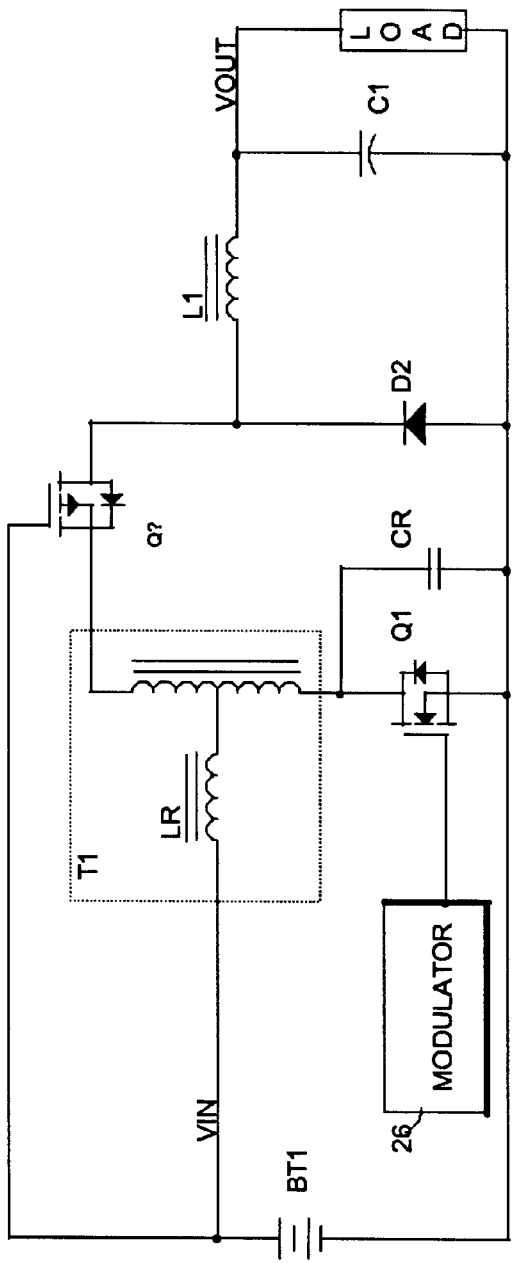
Figure 3F:
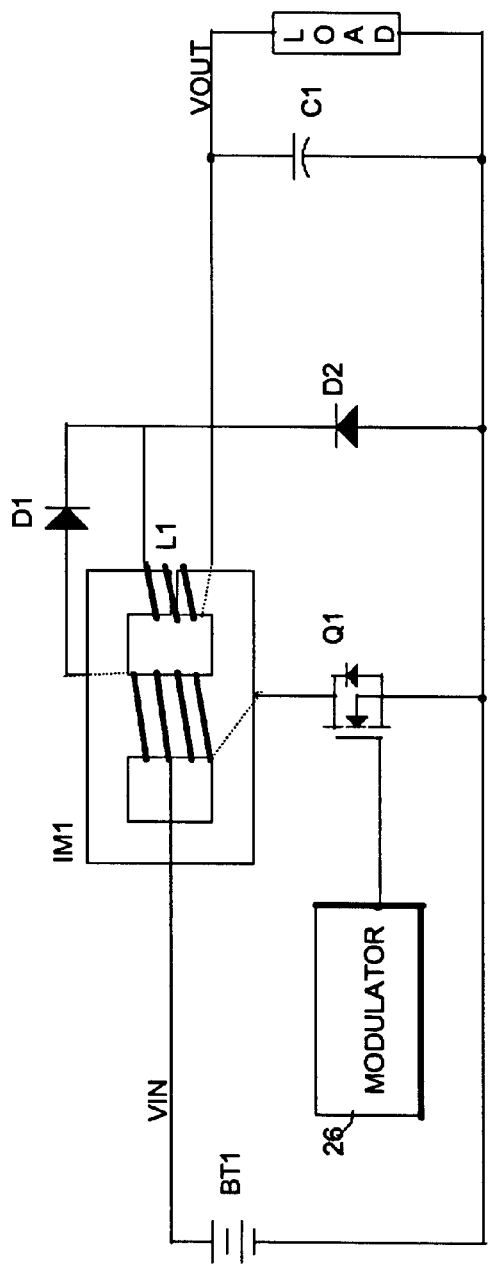

A further improvement on the circuit arrangement of the embodiment of FIG. 3A and 3B is the addition of resonant components, the inductor LR and the capacitor CR, FIGS. 3C–3D–3E. A skilled-in-the-art will recognize that the two circuits of FIGS. 3C and 3D are equivalent, and that they can operate in zero current switching (ZCS), while the circuit arrangement of FIG. 3E can operate in zero voltage switching (ZVS), when their modulator 26 is a pulse-frequency modulator supplying appropriate pulse width and pulse frequency. The inductor LR can be just a leakage inductance of the transformer T1, or it can be a separate component. Again, integrated magnetics combining the transformer T1 and the inductor L1 can bring about cost and size savings in addition to reduced ripple current in the output capacitor C1, therefore the ripple voltage of the output voltage VOUT.

Figure 3G:
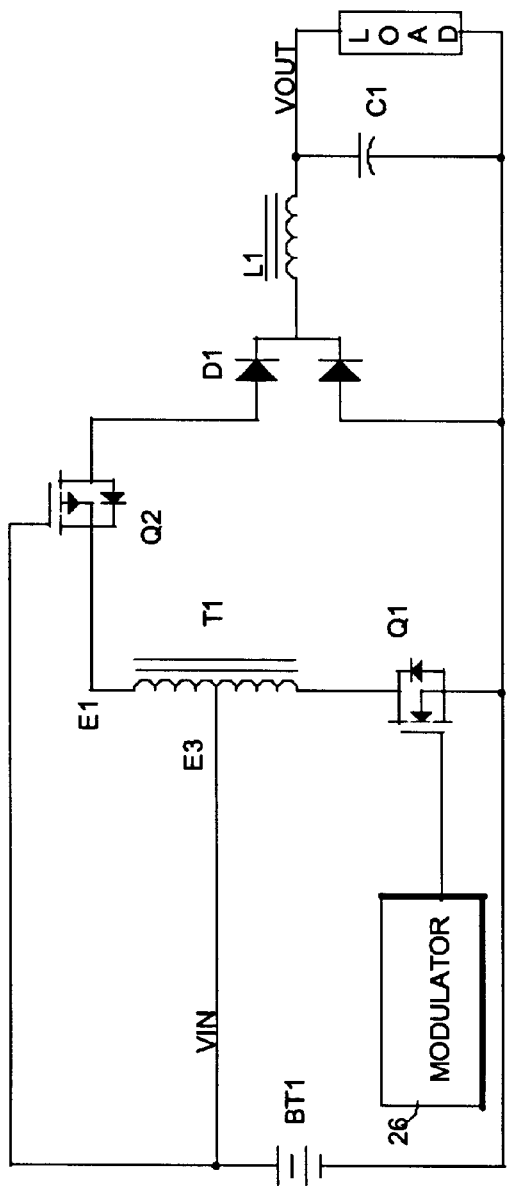
FIG. 3G shows a modified configuration of FIG. 3B for putting out an output voltage that can be lower than the input voltage.
Figure 3H:
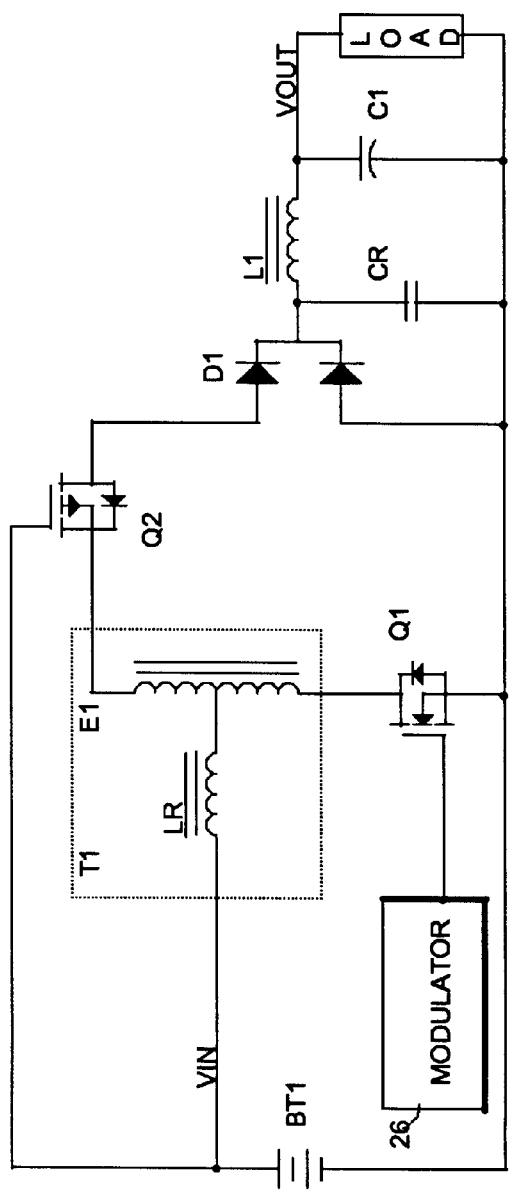
Figure 3I:
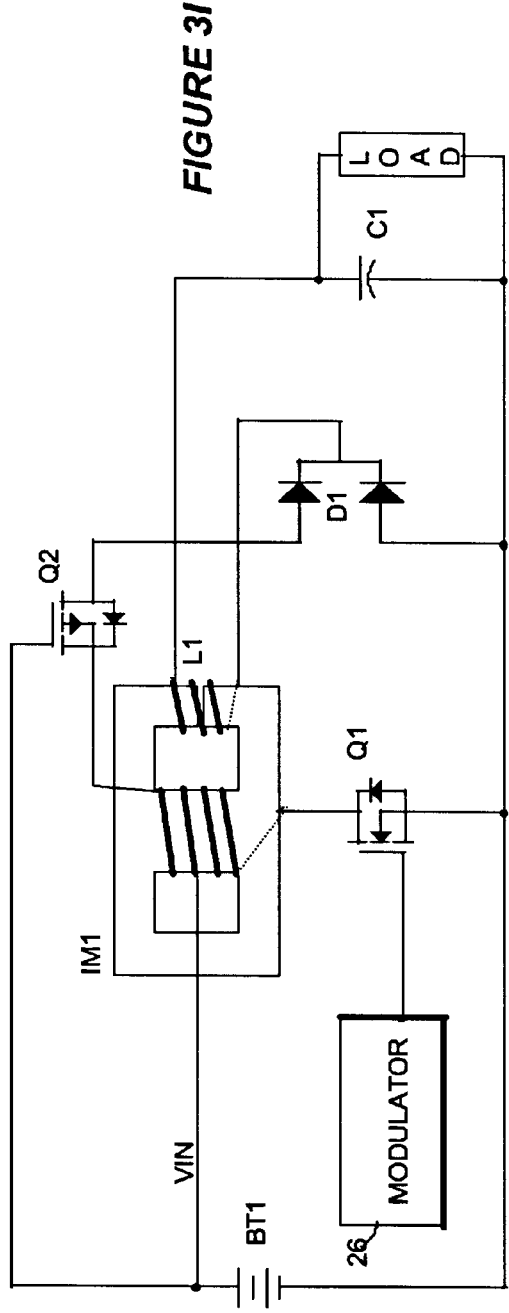
FIG. 3I shows its integrated magnetic derivation and FIG. 3J its ZCS integrated magnetic configuration.
Figure 3J:
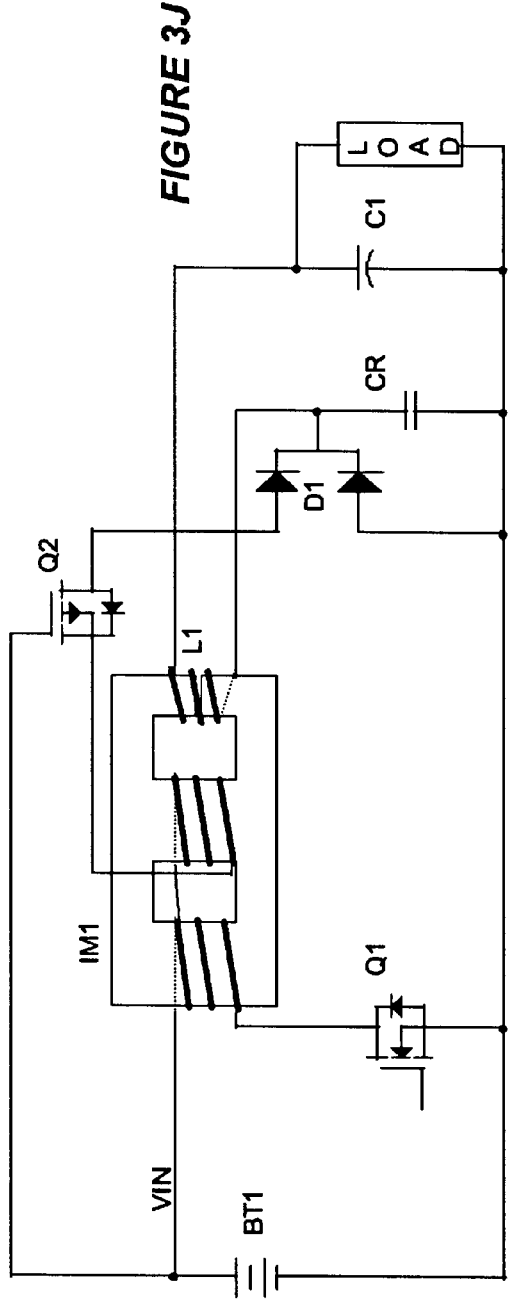

Another improvement on the circuit arrangement of the embodiment of FIG. 3A is the addition of the switch Q2 in series with the tap E1 of the transformer T1. In a typical implementation, FIG. 3G, the switch Q2 is a P-channel MOSFET driven by another tap E3 of the transformer T1, which can be the tap connected to the battery BT1. A center-tapped rectifier D1 can be conveniently used to reduce package count. This converter can supply an output voltage VOUT ranging from zero to a voltage higher than the input voltage VIN. The driving of the switches Q1–Q2 is very simple and economical due to the locations of the switches Q1–Q2. Its version of ZCS is shown FIG. 3H, where the resonant capacitor CR is added across the bottom part of rectifier D1. Its practical implementation using integrated magnetics IM1 is shown in FIG. 3J, where the best mode construction using two windings in series but in two different legs a core to obtain definite value of a leakage inductance LR shown explicitly in FIG. 3H but not practical to show in FIG. 3J. Of course the converter of FIG. 3G can also exist in integrated magnetics form as shown in FIG. 3I.

From the description above, a number of advantages of the invented circuit arrangements become evident:

(a) the current stress on the switches is significantly lower, (b) the transformer can be significantly smaller than a conventional push-pull transformer, or a forward transformer, or a flyback transformer, (c) the energy efficiency is much higher due reduced conduction losses in all components, and in many cases, virtually no switching losses, (d) the switches are either ground-referenced or transformer-referenced, therefore very easy to drive.

SUMMARY, RAMIFICATION AND SCOPE

Accordingly the reader would see that the invented circuit arrangements are significantly advantageous in automotive or battery-operated electronics when compared to well known SMPS topologies such as forward, flyback, push-pull topologies.

Even though embodiments with positive an output voltage were shown, a skilled in the art can recognize that negative output voltages can also be supplied, as well as multiple output voltages by adding appropriate taps on the transformer and additional rectifiers.

While the preferred embodiment of the present invention has been shown and described herein, it will be obvious that such embodiment is provided by way of example only. Numerous variations, changes, and substitutions will occur to those of skill in the art without departing from the invention herein. Thus the scope of the invention should be determined by the appended claims and their legal equivalents, rather than by the example given.

I claim:

1. A power converter supplying a DC output voltage of any magnitude and polarity, the power converter comprising:
   a transformer having a tapped winding with a first terminal, a second terminal, and a third terminal,
   a ground-referenced switching device connected to the first terminal and driven by a modulator,
   a voltage source connected between the second terminal and a ground reference,
   a first unidirectional conducting device connected to the third terminal,
   a second unidirectional conducting device connected between the first unidirectional conducting device and the voltage source, and
   a first inductor for current smoothing.

2. The power converter of claim 1 wherein a second inductor is inserted between the voltage source and the second terminal, and a capacitor is added in parallel with the ground-referenced switch.

3. The power converter of claim 2 wherein the second inductor is formed by from a leakage inductance of the transformer.

4. The power converter of claim 1 wherein a second inductor is inserted between the voltage source and the second terminal, and a capacitor is added in parallel with the second unidirectional conducting device.

5. The power converter of claim 4 wherein the second inductor is formed by from a leakage inductance of the transformer.

6. The power converter of claim 1 wherein a second inductor is inserted in series with the first unidirectional conducting device and a capacitor is added in parallel with the second unidirectional conducting device.

7. The power converter of claim 6 wherein the second inductor is formed by from a leakage inductance of the magnetic means.

8. The power converter of claim 1 wherein a second inductor is inserted in series with the first unidirectional conducting device and a capacitor is added in parallel with the ground-referenced switch.

9. The power converter of claim 8 wherein the second inductor is formed by a leakage inductance of the transformer.

10. The power converter of claim 1 wherein the first inductor is a winding of the transformer.

11. The converter of claim 1 wherein an unidirectional switchable semiconductor device is inserted in series with the third terminal of the transformer.

12. The converter of claim 11 wherein the transformer and the first inductor form an integrated magnetic device.

13. The converter of claim 12 wherein a capacitor is added across the second unidirectional conducting device.

14. The converter of claim 12 wherein a capacitor is added across the second unidirectional conducting device.

15. A power converter supplying an output voltage higher than an input voltage thereof, the converter comprising:
   a center-tapped transformer having a multiple-tap winding with a first terminal, a second terminal, a third terminal which is a center tap, a fourth terminal, and a fifth terminal,
   a first and second ground-referenced switches selectively connecting the first and second terminals of the transformer to a ground reference,
   a voltage source connected between the third terminal of the transformer the ground reference,
   a first unidirectional conducting device connected to the fourth terminal of the transformer
   a second unidirectional conducting device connected to the fifth terminal of the transformer and having a common node with the first unidirectional conducting device, and
   a modulator adapted to drive the first and second ground-referenced switches.

16. The power converter of claim 15 wherein the first unidirectional conducting device and the second unidirectional conducting device are replaced by a first MOSFET and a second MOSFET driven synchronously to the first switch and the second switch.

17. The power converter of claim 15 wherein a buck converter is additionally connected to the common node of the first and the second unidirectional conducting devices, the buck converter being driven synchronously by the modulator.

18. The power converter of claim 15 wherein additionally a capacitor is connected to the common node of the first and the second unidirectional conducting devices, the capacitor resonating with leakage inductance of the transformer.

19. The power converter of claim 18 wherein the first and second unidirectional conducting devices are replaced with a first and a second bi-directional switches.

20. The power converter of claim 18 wherein additionally a unidirectional conducting device is connected across the capacitor.

21. The power converter of claim 15 wherein additionally a first capacitor and a second capacitor are connected across the first ground-referenced switch and the second ground-referenced switch, the first and second capacitors resonating with a leakage inductance of the transformer so that the first and second ground-referenced switches operate in turn in zero voltage switching mode.

* * * * *